No. 614,193. Patented Nov. 15, 1898.
M. C. WHITE.
ANTIRATTLING THILL COUPLING.
(Application filed Dec. 13, 1897.)
(No Model.)
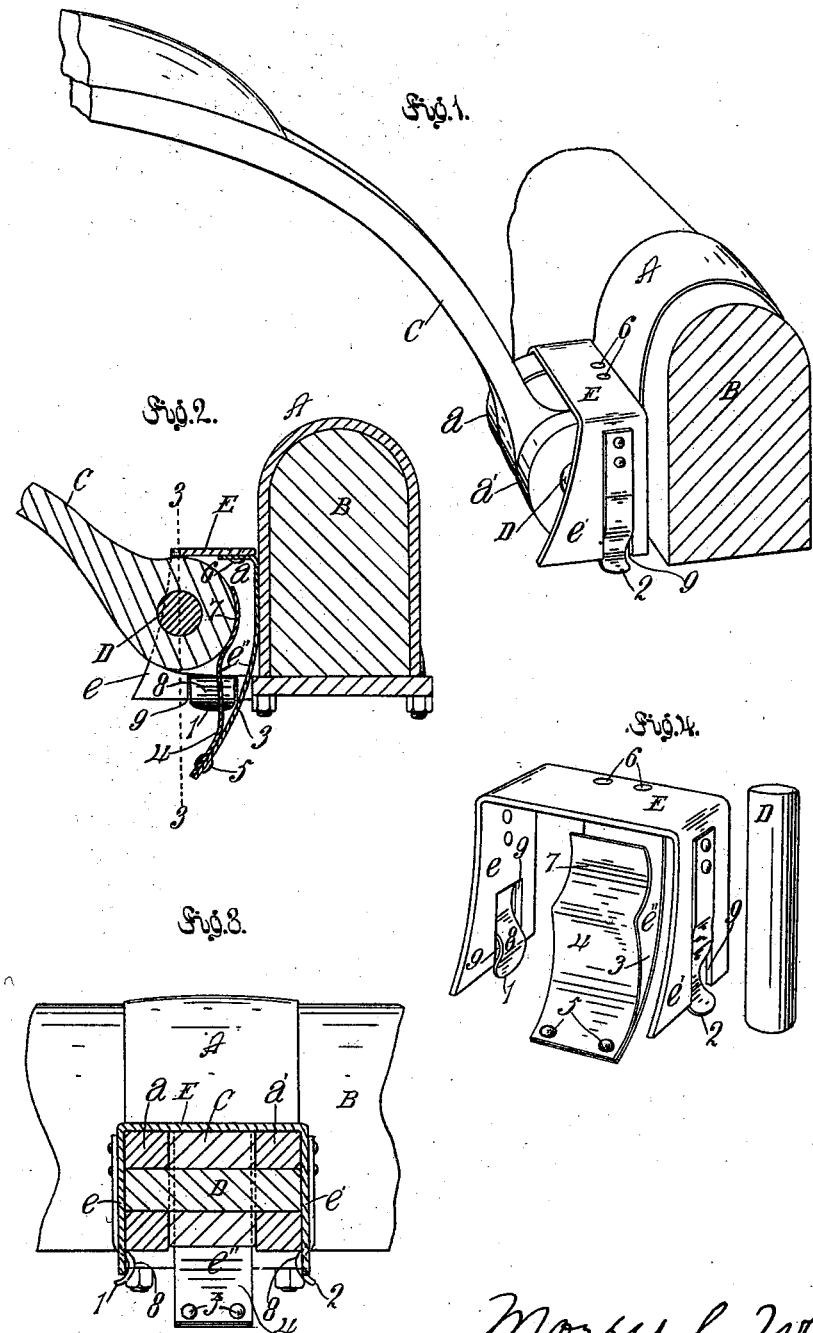

UNITED STATES PATENT OFFICE.

MORRIS C. WHITE, OF LOS ANGELES, CALIFORNIA.

ANTIRATTLING THILL-COUPLING.

SPECIFICATION forming part of Letters Patent No. 614,193, dated November 15, 1898.

Application filed December 13, 1897. Serial No. 661,739. (No model.)

*To all whom it may concern:*

Be it known that I, MORRIS C. WHITE, a citizen of the United States, residing at Los Angeles, in the county of Los Angeles and State of California, have invented a new and useful Improvement in Antirattlers and Thill-Couplers, of which the following is a specification.

The object of this invention is to provide an improved device in that kind of antirattler and thill-coupler which is adapted for readily and perfectly securing thills or tongues to the axle without the use of threaded bolts and nuts; also, to prevent any rattling of the parts where fastened.

My invention consists in an antirattler and thill-coupler comprising the combination, with the axle-clip and a thill-shank, of a pintle inserted through the shank in the clip-lugs and a yoke to fit over the lugs and end of the shank and having downwardly-extending arms to extend across the ends of the pintle, with a spring or springs to fit under the lugs to hold the yoke in place. For the purpose of absolutely preventing any rattling I use the stiff spring fastened to the yoke and pressing against the end of the thill-shank which is common in devices of this kind.

The accompanying drawings illustrate my invention.

Figure 1 is a perspective view of my invention in use. A fragment of an axle and thill is shown. Fig. 2 is a mid-section cutting across the axle and pintle. Fig. 3 is a section cutting lengthwise of the pintle on line 3 3, Fig. 2. Fig. 4 is a perspective detail of the yoke and pintle detached.

In the drawings, A indicates the axle-clip; B, the axle; C, the thill-shank, and D is the pintle inserted through the shank and clip-lugs $a$ $a'$. The pintle is preferably of exact length to extend flush with the outside faces of the clip-lugs $a$ $a'$.

E indicates the yoke to fit over the lugs and end of the shank and having downwardly-extending arms $e$ $e'$ to extend across the ends of the pintle, with springs 1 2 to fit under the lugs to hold the yoke in place from being pushed upward.

$e''$ indicates the spring fastened to the yoke and pressing against the end of the thill-shank. This spring also presses against the clip A, so that its pressure is exerted to press the thill-shank and the clip apart, thus holding the thill-shank firmly against the pintle and preventing any rattling. The spring $e''$ is preferably made with two members 3 4, which are practically of one piece, but as shown in the drawings are preferably made of two pieces riveted together by rivets 5 at the lower ends of the members 3 4. The spring is a U or V shape, the upper end of one member, 3, being riveted to the yoke by rivets 6 and the upper end of the other member being bent to form a recess, as at 7, to fit against the rounded end of the shank. I do not claim this spring as new.

The springs 1 2 are bent to form a curved catch, as at 8, so that the yoke can be applied by placing it at the top of the lugs, with the springs 1 2 embracing and resting against the upper edges of the lugs. Then by forcing the yoke downward the springs are pushed outward by such edges until they have passed below the clip-lugs, when they again spring inward and project under the lugs to thus hold the yoke in place. When it is desired to detach the thills, the yoke can be pushed upward by applying a sufficient force for the purpose, and the lugs, acting on the upper curve of the catch 8, will cause the springs to move outward to pass the clip-lugs, thus allowing the yoke to be removed.

The recess 7 of the spring $e''$ assists to hold the yoke from being removed upward. The springs 1 2 operate through slots or openings 9 in the respective arms $e$ $e'$ of the clip. The lower portions of the arms of the yoke at the sides of the slots or openings 9 form guards to prevent the springs 1 2 from being broken.

When it is desired to attach the tongue or thills to the axle, the shanks thereof are brought into position between the lugs of their repective clips, and a pintle D is inserted into place for each shank. Then the yoke for each shank is pressed down into place, as stated, and the operation is completed. To remove the tongue or thills, the yoke is first removed. Then the pintles are withdrawn and the tongue or thills detached.

Now, having described my invention, what I claim as new, and desire to secure by Letters Patent, is—

1. An antirattler and thill-coupler comprising the combination with an axle-clip and a thill-shank, of a pintle inserted through the shank and the clip-lugs; and a yoke to fit over the lugs and end of the shank and having downwardly-extending arms to extend across the ends of the pintle with springs to fit under the lugs to hold the yoke in place.

2. An antirattler and thill-coupler comprising the combination with an axle-clip and a thill-shank, of a pintle inserted through the shank and the clip-lugs; and a yoke to fit over the lugs and end of the shank and having downwardly-extending arms to extend across the ends of the pintle with springs to fit under the lugs to hold the yoke in place; and a spring fastened to the yoke and pressed against the end of the thill-shank.

3. The combination with an axle-clip and a thill-shank, of a pintle inserted through the shank and the clip-lugs; a yoke to fit over the lugs and the end of the shank and having downwardly-extending arms to extend across the ends of the pintle and provided at the lower ends of said arms with a slot or spring; a V-spring having one arm fastened to the yoke and the other arm to press against the end of the thill-shank and provided with the seat to seat the end of the thill-shank; and springs fastened to the arms of the yoke and extending through the slots or openings and underneath the clip-lugs.

4. The combination with the axle-clip and a thill-shank, of a pintle inserted through the shank and the clip-lugs; a yoke to fit over the clip-lugs and the end of the shank and having downwardly-extending arms to extend across the ends of the pintle, and on each of the said arms a spring with a curved catch thereon to extend under the clip-lugs when the yoke is in place.

M. C. WHITE.

Witnesses:
JAMES R. TOWNSEND,
F. M. TOWNSEND.